(12) United States Patent
Sallam

(10) Patent No.: US 8,613,006 B2
(45) Date of Patent: *Dec. 17, 2013

(54) SYSTEM, METHOD, AND COMPUTER PROGRAM PRODUCT FOR TERMINATING A HIDDEN KERNEL PROCESS

(75) Inventor: Ahmed Said Sallam, Sunnyvale, CA (US)

(73) Assignee: McAfee, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/326,333

(22) Filed: Dec. 15, 2011

(65) Prior Publication Data

US 2012/0084799 A1 Apr. 5, 2012

Related U.S. Application Data

(63) Continuation of application No. 11/840,770, filed on Aug. 17, 2007, now Pat. No. 8,099,740.

(51) Int. Cl.
*G06F 9/44* (2006.01)
(52) U.S. Cl.
USPC .............. 719/331; 719/332; 717/162
(58) Field of Classification Search
None
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 6,766,463 B1 * | 7/2004 | Hadley | 713/503 |
| 7,506,155 B1 | 3/2009 | Stewart et al. | |
| 7,814,549 B2 | 10/2010 | Park | |
| 7,841,006 B2 | 11/2010 | Gassoway | |
| 7,874,001 B2 | 1/2011 | Beck et al. | |
| 8,127,360 B1 * | 2/2012 | Wilhelm et al. | 726/25 |
| 2005/0120237 A1 | 6/2005 | Roux et al. | |
| 2005/0204205 A1 | 9/2005 | Ring et al. | |
| 2005/0229250 A1 | 10/2005 | Ring et al. | |
| 2007/0022287 A1 | 1/2007 | Beck et al. | |
| 2007/0300061 A1 | 12/2007 | Kim et al. | |
| 2008/0104130 A1 | 5/2008 | Sallam | |
| 2008/0109906 A1 | 5/2008 | Sallam | |
| 2008/0127344 A1 | 5/2008 | Sallam | |

OTHER PUBLICATIONS

Butler, Jamie, and Greg Hoghund, "VICE—Catch the hookers!" Proceedings of Black Hat USA 2004 Briefings & Training, Jul. 24-29, 2004, Las Vegas, NV.
Butler, Jamie, and Peter Silberman, "RAIDE: Rootkit Analysis Identification Elimination," Proceedings of Black Hat USA 2006 Briefings and Training, Jul. 29-Aug. 3, 2006, Las Vega, NV.
Cole, "Detection of Computer System Intruder Access via Profiling of Kernel Memory and User Behaviour", (no date), pp. 1-11.
Xu et al., "Dynamic Detection of Process-Hiding Kernel Rootkits," [in Mar. 3, 2011 Nonfinal Office Action of U.S. Appl. No. 11/840,770], pp. 1-12.

* cited by examiner

*Primary Examiner* — Van Nguyen
(74) *Attorney, Agent, or Firm* — Patent Capital Group

(57) ABSTRACT

A system, method, and computer program product are provided for terminating a hidden kernel process. In use, a hidden kernel process structure associated with a hidden kernel process is identified. In addition, the hidden kernel process structure is inserted into an active process list. Further, the hidden kernel process is terminated.

20 Claims, 5 Drawing Sheets

SYSTEM, METHOD, AND COMPUTER PROGRAM PRODUCT FOR TERMINATING A HIDDEN KERNEL PROCESS

RELATED APPLICATION

This application is a continuation (and claims the benefit of priority under 35 U.S.C. §120) of U.S. application Ser. No. 11/840,770, filed Aug. 17, 2007, now U.S. Pat. No. 8,099,740, entitled "SYSTEM, METHOD, AND COMPUTER PROGRAM PRODUCT FOR TERMINATING A HIDDEN KERNEL PROCESS," Inventor Ahmed Said Sallam. The disclosure of the prior application is considered part of (and is incorporated by reference in) the disclosure of this application.

FIELD OF THE INVENTION

The present invention relates to terminating unwanted activity, and more particularly to terminating unwanted activity associated with kernel processes.

BACKGROUND

Security systems have generally been developed for detecting and terminating unwanted activity. For example, unwanted activity has oftentimes been a result of unwanted processes (e.g. root kits, etc.). However, such security systems have generally exhibited various limitations in situations where the unwanted processes are hidden.

For example, unwanted processes are sometimes capable of hiding themselves within an operating system. Many times, an unwanted process hides by removing an EPROCESS structure associated with such unwanted process from an active process list of the operating system. Generally, such EPROCESS structures are utilized for managing (e.g. identifying, etc.) processes. Thus, the unwanted process may protect itself from being terminated via the active process list by removing the EPROCESS structure to which it is associated.

In particular, security systems sometimes utilize a ZwTerminateProcess function to terminate processes. Such function calls a PspProcessDelete function which adjusts pointers within the active process list for terminating the unwanted process. However, in situations where a hidden process removes the EPROCESS structure from the active process list, pointers within the active process list are not associated with the unwanted process. Thus, adjustment of the pointers may be incapable of terminating the unwanted process, and furthermore, the active process list may become corrupted.

Still yet, some unwanted processes are capable of modifying the pointers of an associated EPROCESS structure within the active process list. For example, the pointers may be modified to point to invalid addresses. Accordingly, an error within the operating system may occur when the ZwTerminateProcess function is executed for terminating such unwanted processes.

There is thus a need for addressing these and/or other issues associated with the prior art.

SUMMARY

A system, method, and computer program product are provided for terminating a hidden kernel process. In use, a hidden kernel process structure associated with a hidden kernel process is identified. In addition, the hidden kernel process structure is inserted into an active process list. Further, the hidden kernel process is terminated.

DETAILED DESCRIPTION

Figure 1:
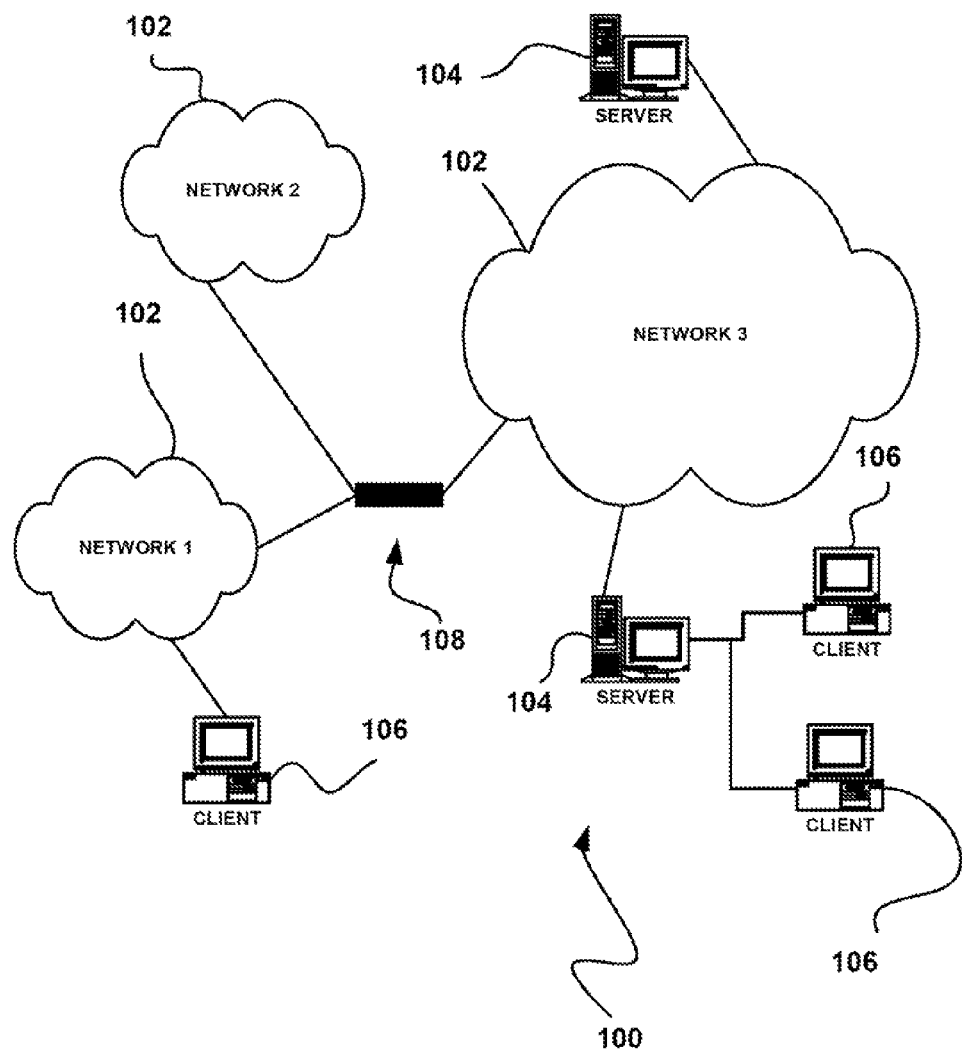
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
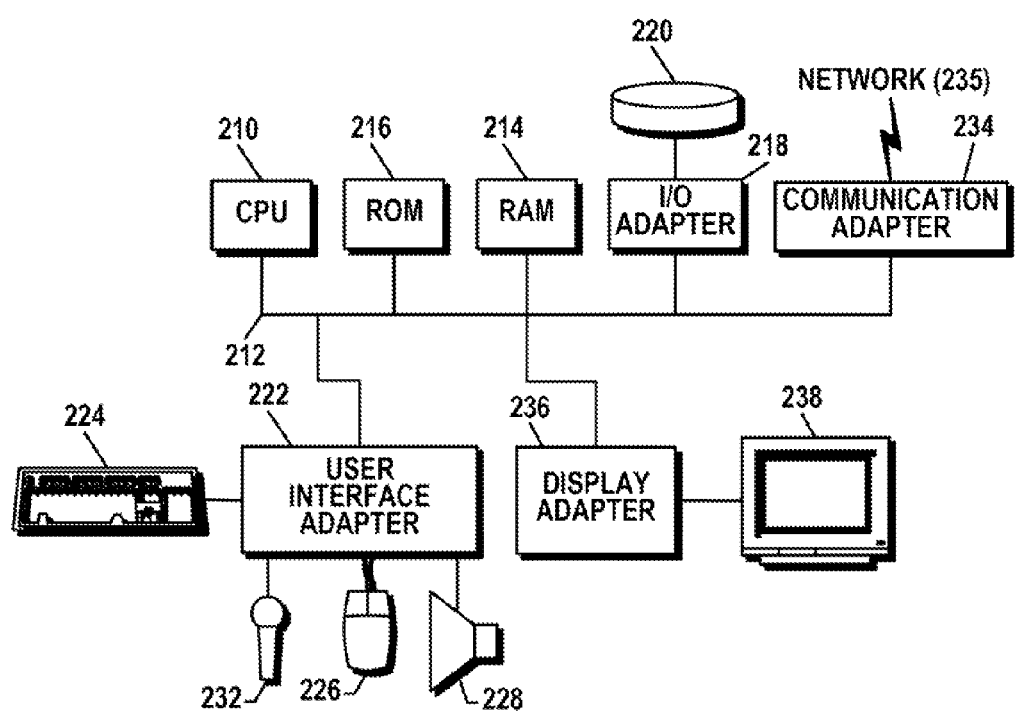
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
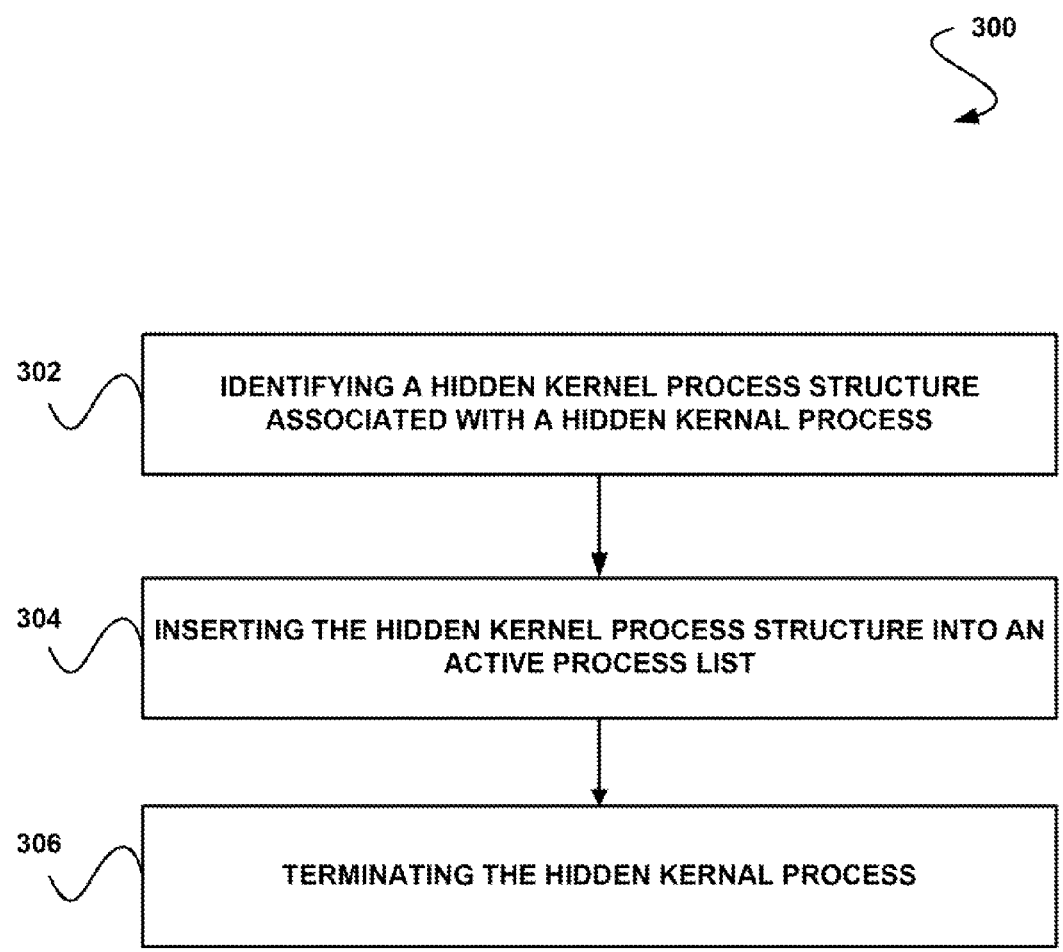
FIG. 3 shows a method for terminating a hidden kernel process, in accordance with one embodiment.

FIG. 3 shows a method 300 for terminating a hidden kernel process, in accordance with one embodiment. As an option, the method 300 may be carried out in the context of the architecture and environment of FIGS. 1 and/or 2. Of course, however, the method 300 may be carried out in any desired environment.

As shown in operation 302, a hidden kernel process structure associated with a hidden kernel process is identified. In the context of the present description, the hidden kernel process may include any kernel process for which a hidden kernel process structure may be identified. For example, the hidden kernel process may include a hidden process executing within a kernel of an operating system.

In addition, the hidden kernel process may be associated with any computer code (e.g. unwanted code, malicious code, etc.). In one embodiment, the hidden kernel process may be a process of an application, computer program, etc. Just by way of example, the hidden kernel process may include a process of a rootkit.

Furthermore, the kernel process may be hidden in any desired manner. In one embodiment, the hidden kernel process may include a kernel process hidden from a process enumeration. Just by way of example, the process enumeration may include a function capable of enumerating (e.g. identifying, listing, etc.) at least one process. Optionally, the process enumeration may include an operating system process enumeration. To this end, the kernel process may be hidden by preventing identification of itself via the process enumeration.

Also in the context of the present description, the hidden kernel process structure may include any data structure associated with the hidden kernel process. In one embodiment, the hidden kernel process structure may include information utilized for managing the hidden kernel process. For example, the hidden kernel process structure may include information capable of being utilized for managing operations of the hidden kernel process. Such operations management may include execution of the hidden kernel process, identification of the hidden kernel process, etc.

In another embodiment, the hidden kernel process structure may be particular to the operating system with which the hidden kernel process is associated. Just by way of example, the hidden kernel process structure may include a hidden EPROCESS structure associated with a MICROSOFT® WINDOWS® operating system.

Still yet, the kernel process structure may be hidden in any desired manner. In one embodiment, the kernel process structure may be hidden by being removed from a list of kernel process structures identified utilizing the process enumeration. Such list may optionally include an active process list, as described in more detail below with respect to operation 304. To this end, the hidden kernel process structure may include an orphan kernel process structure.

In another embodiment, the kernel process structure may be hidden by modifying pointers associated with the kernel process structure. For example, such pointers may be modified to point to an invalid memory address. Such invalid memory address may include any memory address associated with code other than the hidden kernel process, as an option.

Moreover, the hidden kernel process structure may be identified by identifying the hidden kernel process. Further, such hidden kernel process may be identified by monitoring object (e.g. file, registry, etc.) manipulations. For example, the hidden kernel process structure may be identified in response to an object manipulation initiated by such hidden kernel process. Of course, however, the hidden kernel process structure may be identified in any manner.

Additionally, the hidden kernel process structure is inserted into the active process list, as shown in operation 304. The active process list may include any list of active kernel processes, with respect to the present description. Optionally, the active kernel processes may include any kernel processes being executed, scheduled to be executed, assigned to a thread for execution, etc. Such active process list may be utilized for tracking the active kernel processes, as another option.

In one embodiment, the active process list may include information associated with the active kernel processes. For example, the active process list may include a plurality of kernel process structures, each associated with one of the active kernel processes. As an option, the active process list may include a double linked list in which the kernel process structures are linked. In another embodiment, the active process list may be utilized for enumerating any of the active kernel processes.

In still another embodiment, the hidden kernel process may be inserted into the active process list by modifying pointers. In one example, such pointers may be included in the hidden kernel process structure. In another example, the pointers may be included in the active process list. It should be noted, however, that the hidden kernel process structure may be inserted into the active process list in any manner. Accordingly, the hidden kernel process structure may be inserted into the active process list such that a process enumeration associated with the active process list may return the hidden kernel process associated with the hidden kernel process structure, in one embodiment.

As further shown, the hidden kernel process is terminated. Note operation 306. In the context of the present description, termination of the hidden kernel process may include preventing execution, stopping execution, etc. of the hidden kernel process. Optionally, the hidden kernel process may be terminated utilizing a termination function. Such termination function may be a predefined operating system process termination function, for example.

In one embodiment, the hidden kernel process may be terminated by removing the hidden kernel process structure from the active process list. Such removal may include modifying pointers associated with other kernel process structures in the active process list. For example, the pointers may be modified to not point to the hidden kernel process structure (e.g. point to any of the other kernel process structures in the active process list, etc.).

In this way, the hidden kernel process structure may be inserted into the active process list, such that the hidden kernel process may be terminated by removing the inserted hidden kernel process structure from the active process list. Accordingly, the hidden kernel process may be terminated after inserting the hidden kernel process structure into the active process list. Thus, in one embodiment, a hidden kernel process of a rootkit, for example, may be terminated. As an option, the hidden kernel process may be terminated by a security system (e.g. virus scanner, etc.), for example, by calling the termination function.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
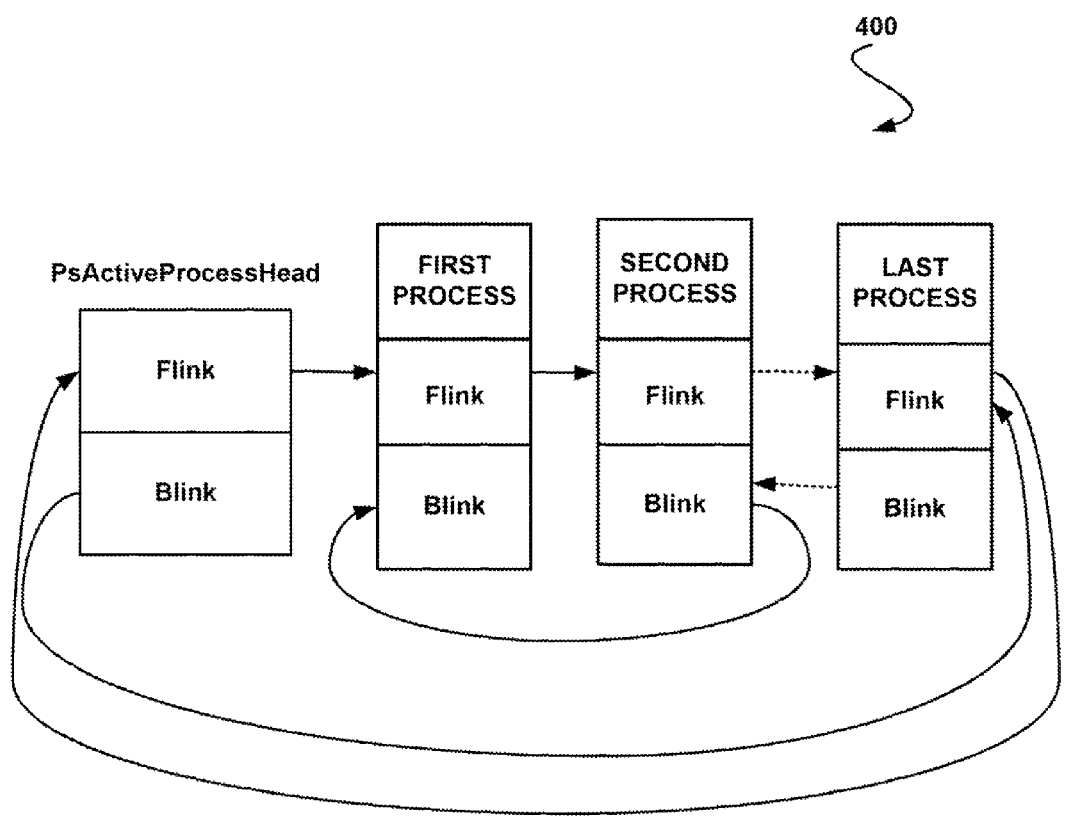
FIG. 4 shows an implementation of an active process list, in accordance with another embodiment.

FIG. 4 shows an implementation of an active process list 400, in accordance with another embodiment. As an option, the active process list 400 may be implemented in the context of the architecture and environment of FIGS. 1-3. For example, the active process list 400 may be implemented in the context of operation 304 of FIG. 3. Of course, however, the active process list 400 may be implemented in any desired environment. It should also be noted that the aforementioned definitions may apply during the present description.

As shown, the active process list 400 includes a plurality of kernel process structures each associated with a different kernel process (first process, second process, etc.). Optionally, the first kernel process structure in the active process list 400 may be associated with a system process in which an operating system kernel executes. Such first kernel process structure may always be associated with such system process, in one embodiment. The active process list 400 includes a circular double linked list. In this way, the kernel process structures may be linked together within the active process list 400.

The kernel process structures each include two pointers, represented as Flink and Blink as shown. The Flink and Blink pointers for each kernel process structure may be included in an active process links structure. To this end, the kernel process structures may each include a different active process links structure.

In the context of the present embodiment, the Flink pointer of a kernel process structure may include a forward link which points to the active process links of a next kernel process structure in the active process list 400. Thus, for example, the Flink pointer of the first kernel process structure in the active process list 400 may point to the Flink pointer of the second kernel process structure in the active process list 400, the Flink pointer of the second kernel process structure may point to an Flink pointer of a third kernel process structure in active process list 400, and so forth. However, the Blink pointer may include a backward link which points to the active process links of a previous kernel process structure in the active process list 400. Just by way of illustration, the Blink pointer of the second kernel process structure may point to the Blink pointer of the first kernel process structure, etc.

As also shown, the active process list 400 is represented by a PsActiveProcessHead pointer. The PsActiveProcessHead pointer further includes two pointers, a Flink pointer and a Blink pointer. The Flink pointer of the PsActiveProcessHead includes a forward link which points to the active process links of the first kernel process structure in the active process list 400. As specifically shown, the Flink pointer of the PsActiveProcessHead pointer points to the Flink pointer of such first kernel process structure.

The Blink pointer of the PsActiveProcessHead includes a backward link which points to the active process links of the last kernel process structure in the active process list 400. As shown, the Blink pointer of the PsActiveProcessHead points to the Flink pointer of such last kernel process structure.

Further, the active process links of the last kernel process structure may point to the PsActiveProcessHead. In particular, the Flink, pointer of the last kernel process structure may point to the Flink pointer of the PsActiveProcessHead. By pointing the Blink pointer of the PsActiveProcessHead to the last kernel process structure, and the Flink pointer of the last kernel process structure to the Flink pointer of the PsActiveProcessHead, the active process list is circular.

Table 1 illustrates on example of returning the contents of PsActiveProcessHead in memory. It should be noted that the contents shown in Table 1 are set forth for illustrative purposes only, and thus should not be construed as limiting in any manner.

TABLE 1 kd> dd PsActiveProcessHead
8056ede8 825f1830 82178e10 00000000 00000000

8056ede8: PsActiveProcessHead
825f1830: active process links of the first process in the active process list
82178e10: active process links of the last process in the active process list In one embodiment, the kernel process structures may be removed (e.g. deleted, etc.) from the active process list 400. Removal of such kernel process structure may result in termination of the associated kernel process. For example, a target kernel process structure may be removed by modifying the Flink pointer associated with another kernel process structure immediately previous to the target kernel process structure in the active process list 400. Such Flink pointer may be modified to point to the kernel process structure immediately subsequent to the target kernel process structure.

In addition, the Blink pointer of such subsequent kernel process structure may be modified to point to such previous kernel process structure. In this way, the Flink pointer of the previous kernel process structure may be modified to point to the new next kernel process structure and the Blink pointer of the subsequent kernel process structure may be modified to point to the new previous kernel process structure, such that the target kernel process structure is not pointed to by any other kernel process structures in the active process list 400. Accordingly, the target kernel process structure may be removed from the list of kernel process structures in the active process list 400.

Table 2 illustrates exemplary code for removing a kernel process structure from an active process list. Such code may be associated with an operating system function for terminating processes associated with the active process list. For example, the code may include the code for the MICROSOFT® WINDOWS® NTOSKRNL function PspProcessDelete. Further, the code may be called utilizing an exported kernel function, such as ZwTerminateProcess. As shown, the code takes as an input parameter a pointer to the target kernel process structure to be removed (pEPROCESS). Again, it should be noted that such code is set forth for illustrative purposes only, and thus should not be construed as limiting in any manner.

TABLE 2

| PAGE: 004B531A | ; _stdcall PspProcessDelete(x) |
| PAGE: 004B531A | _PspProcessDelete@4 proc near |
| PAGE: 004B531A | var_18 = dword ptr −18h |
| PAGE: 004B531A | arg_0 = dword ptr 8 |
| PAGE: 004B531A | |
| PAGE: 004B531A | move edi, edi |
| PAGE: 004B531C | push ebp |
| PAGE: 004B531D | mov ebp, esp |

TABLE 2-continued

| PAGE: 004B531F | sub | esp, 18h | |
|---|---|---|---|
| PAGE: 004B5322 | push | ebx | |
| PAGE: 004B5323 | push | exi | |
| PAGE: 004B5324 | mov | esi, [ebp+arg_0] | //this is pEPROCESS |
| PAGE: 004B5327 | xor | ebx, ebx | |
| PAGE: 004B5329 | cmp | [esi+88h], ebx | //offset +_88 is for active //process links in EPROCESS //structure |
| PAGE: 004B532F | push | edi | |
| PAGE: 004B5330 | jz | short, loc_4b5379 | //if the pEPROCESS points // to Flink of active process // links, then = 0 |
| PAGE: 004B5332 | mov | eax, large fs:124h | |
| PAGE: 004B5338 | mov | edi, eax | |
| PAGE: 004B533A | dec | dword ptr [edi+0D4h] | |
| PAGE: 004B5340 | mov | ebx, offset _PspActiveProcessMutex | //this is the //mutex used whenever there // is access to the active //process links |
| PAGE: 004B5345 | mov | ecx, ebx | |
| PAGE: 004B5347 | call | @EXAcquireFastMutexUnsafe@4 | |
| PAGE: 004B534C | mov | ecx, [esi+8Ch] | //pEPROCESS points to // Flink of active process // links |
| PAGE: 004B5352 | mov | eax, [esi+88h] | //pEPROCESS points Blink // of active process links |
| PAGE: 004B5358 | mov | [ecx], eax | //modify pEPROCESS such //that Flink of previous //kernel process structure //points to active process //links of next kernel process //structure |
| PAGE: 004B535A | mov | [eax+4], ecx | //modify pEPROCESS such //that Blink pointer of next //kernel process structure //points to active process //links of previous kernel //process structure |
| PAGE: 004B532D | mov | exc, ebx | |
| PAGE: 004B532F | call | @ExReleaseFastMutexUnsafe@4 | |

In another embodiment, a process enumeration may be utilized by a user-mode program, kernel-mode device, etc. for requesting a list of kernel process running within the operating system. The kernel of such operating system may use the Flink pointer of the active process links of the kernel process structures to traverse the Flink pointers within the active process list 400, such that a list of kernel processes may be returned to the requestor.

Figure 5:
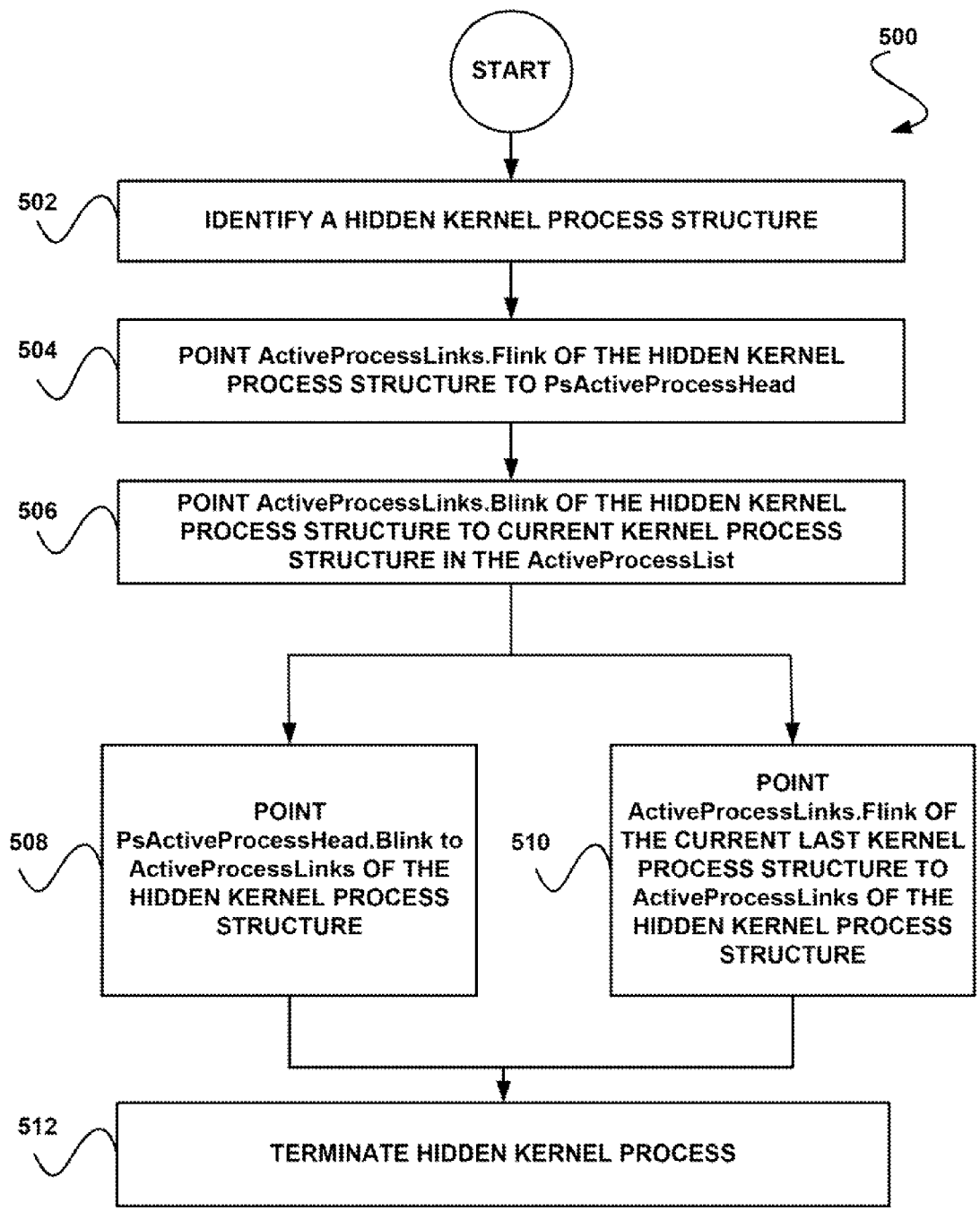
FIG. 5 shows a method for inserting a hidden kernel process structure into an active process list for terminating a hidden kernel process associated with the hidden kernel process structure, in accordance with yet another embodiment.

FIG. 5 show a method 500 for method for inserting a hidden kernel process structure into an active process list for terminating a hidden kernel process associated with the hidden kernel process structure, in accordance with yet another embodiment. As an option, the method 500 may be carried out in the context of the architecture and environment of FIGS. 1-4. Of course, however, the method 500 may be carried out in any desired environment. Again, it should also be noted that the aforementioned definitions may apply during the present description.

As shown in operation 502, a hidden kernel process structure is identified. In one embodiment, the hidden kernel process structure may be identified by identifying the hidden kernel process. Further, pointers (Flink, Blink) associated with the identified hidden kernel process may be identified (e.g. by analyzing code associated with the hidden kernel process, etc.). To this end, such pointers may be utilized for determining the hidden kernel process structure, such as, for example, an active process links structure (ActiveProcessLinks) of the hidden kernel process structure.

In addition, ActiveProcessLinks.Flink of the hidden kernel process structure is modified to point to a pointer (PsActiveProcessHead) which represents an active process list. Note operation 504. Thus, a forward link of the active process links structure of the hidden kernel process structure may be modified to point to a pointer. As shown, such pointer may represent the active process list.

Further, as shown in operation 506, ActiveProcessLinks.Blink of the hidden kernel process structure is modified to point to a current last kernel process structure in the active process list. In the context of the present embodiment, the current last kernel process structure may include the last kernel process structure in the active process list. To this end, a backward link of the active process links structure of the hidden kernel process may be modified to point to a last kernel process structure in the active process list. In one embodiment, such last kernel process structure may be pointed to by a backward link of the PsActiveProcessHead, such that the last kernel process structure may be identified by determining the kernel process structure pointed to by the backward link of the PsActiveProcessHead.

Still yet, the PsActiveProcessHead.Blink is modified to point to the ActiveProcessLinks of the hidden kernel process structure, as shown in operation 508. In this way, the backward link of the PsActiveProcessHead may be modified from pointing to the current last kernel process structure in the active process list to point to the forward link of the active process links structure of the hidden kernel process structure. Accordingly, the hidden kernel process structure may be pointed to by the PsActiveProcessHead as the new last kernel process structure.

Moreover, the ActiveProcessLinks.Flink of the current last kernel process structure is modified to point to the ActiveProcessLinks of the hidden kernel process structure. Note operation 510. For example, the ActiveProcessLinks.Flink of the current last kernel process structure is modified to point to the ActiveProcessLinks.Flink of the hidden kernel process structure. Thus, a forward link of the active process links structure of the current last kernel process structure may be modified to point to the active process links of the hidden kernel process structure. Accordingly, the hidden kernel process structure may be pointed to by the current last kernel process structure, thus resulting in the hidden kernel process structure being the new last kernel process structure in the active process list. To this end, in one embodiment, operations 504-510 may be utilized for inserting the hidden kernel process structure into the active process list (e.g. by appending the hidden kernel process structure to the end of the active process list).

As shown, operations 508-510 may be performed in parallel. For example, operations 508-510 may be performed concurrently. Further, in one embodiment, operations 508-510 may include memory operations that are synchronized. The operations (508-510) may be synchronized with an operating system kernel. Optionally, the synchronization may be performed by acquiring a mutex (e.g. PspActiveProcessMutex of Table 2, etc.) prior to performing operations 508-510.

Such synchronization may prevent the backward link of the PsActiveProcessHead from being modified (e.g. by creation of a new kernel process structure added to the active process list, by removal of the current last kernel process structure in the active process list, etc.) during, but without respect to, operations 508-510. In this way, the active process list may be prevented from being associated with an undetermined state during insertion of the hidden kernel process structure into the active process list. As another option, operations 508-510 may be performed utilizing a predefined function (PspProcessDelete). For example, such function may acquire the mutex in addition to performing operations 508-510. Additionally, the mutex may be released after operations 508-510 are performed.

As also shown, a hidden kernel process associated with the hidden kernel process structure is terminated. Note operation 512. Such process may be terminated by removing the hidden kernel process structure from the active process list, in one embodiment. For example, the abovementioned predefined function may be called for terminating such hidden kernel process. Optionally, the predefined function may modify the backward link of the active process links structure of a subsequent kernel process structure (e.g. immediately subsequent to the removed kernel process structure) to point to a previous kernel process structure (e.g. immediately previous to the removed kernel process structure), and may further modify the forward link of the active process links structure of such previous kernel process structure to point to such subsequent kernel process structure. In this way, the hidden kernel process structure may be removed from the active process list, thus terminating the hidden kernel process, in one embodiment.

Appendix A illustrates one example of code capable of being utilized for inserting a hidden kernel process structure into an active process list for terminating a hidden kernel process associated with the hidden kernel process structure, in accordance with the method 500 of FIG. 5. It should be noted that such code is set forth for illustrative purposes only, and thus should not be construed as limiting in any manner.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

APPENDIX A

```
DWORD           nSystemProcesses;
typedef struct __ACTIVE_PROCESS_LIST
{
    struct __ACTIVE_PROCESS_LIST * NextProcess;
    struct __ACTIVE_PROCESS_LIST * PreviousProcess;
} ACTIVE_PROCESS_LIST, * PACTIVE_PROCESS_LIST;
typedef struct __GLOBALS {
    PVOID                       SystemProcessEProcess;
    PACTIVE_PROCESS_LIST        PsActiveProcessHead;
    DWORD                       ActiveProcessLinksOffset;
} GLOBALS;
GLOBALS globals;
NTSTATUS DriverEntry( IN PDRIVER_OBJECT DriverObject, IN
PUNICODE_STRING RegistryPath )
{
    globals.PsActiveProcessHead = NULL;
    globals.SystemProcessEProcess = PsGetCurrentProcess( );
    switch (OsVer)
    {
    case OS_VER_WXP:
        globals.ActiveProcessLinksOffset = 0x88;
        break;
    case OS_VER_W2K:
        globals.ActiveProcessLinksOffset = 0xa0;
        break;
    case OS_VER_W2003:
        globals.ActiveProcessLinksOffset = 0x88;
        break;
    case OS_VER_W2003_SP1:
        globals.ActiveProcessLinksOffset = 0x88;
        break;
    default:
        globals.ActiveProcessLinksOffset = 0;
        break;
    }
    if ((globals.ActiveProcessLinksOffset > 0) && (globals.SystemProcessEProcess !=
```

APPENDIX A-continued

```
NULL))
   {
      PACTIVE_PROCESS_LIST SystemProcessActiveProcessLinks;
      SystemProcessActiveProcessLinks = (PACTIVE_PROCESS_LIST)((BYTE
*)globals.SystemProcessEProcess+globals.ActiveProcessLinksOffset);
      globals.PsActiveProcessHead    =
(PACTIVE_PROCESS_LIST)SystemProcessActiveProcessLinks->PreviousProcess;
   }
}
NTSTATUS TerminateProcess ( DWORD Pid )
{
   NTSTATUS
        ntStatus=STATUS_INSUFFICIENT_RESOURCES;
   HANDLE                  hProcess;
   CLIENT_ID               ClientId;
   OBJECT_ATTRIBUTES ObjAttr;
   NTSTATUS                ExitStatus=0;
      if ( Pid>8 )
{
      InitializeObjectAttributes ( &ObjAttr, NULL,
OBJ_KERNEL_HANDLE|OBJ_CASE_INSENSITIVE, NULL, NULL );
      ClientId.UniqueProcess = (HANDLE)Pid;
      ClientId.UniqueThread = NULL;
      ntStatus = ZwOpenProcess_t ( &hProcess, PROCESS_TERMINATE, &ObjAttr,
&ClientId );
      if ( NT_SUCCESS ( ntStatus ) )
         {
                   // check if the process is correctly in the ActiveProcessList or not.
                   PACTIVE_PROCESS_LIST pActiveProcessList_Next;
                   PACTIVE_PROCESS_LIST pActiveProcessList_Previous;
                   BOOL                 bFoundNextList
         = FALSE;
                   BOOL                 bFoundPreviousList =
FALSE;
                   if
((globals.PsActiveProcessHead!=NULL)&&(globals.ActiveProcessLinksOffset != 0)
&&
                         (globals.PsActiveProcessHead->NextProcess != NULL)
&& (globals.PsActiveProcessHead->PreviousProcess != NULL))
                   {
                          DWORD * TerminateProcess;
                          DWORD     nCheckedProc = 0; // to compare against the
                                                      //nSystemProcesses
                                                      //global variable
                          ntStatus = ObReferenceObjectByHandle ( hProcess,
SYNCHRONIZE, NULL, KernelMode, &TerminateProcess, NULL );
                          if ( NT_SUCCESS ( ntStatus ) )
                          {
                                 // scan the Flink pointers
                                 pActiveProcessList_Next =
(PACTIVE_PROCESS_LIST) globals.PsActiveProcessHead->NextProcess;
                                 do
                                 {
                                        DWORD *
      CurrentProcess;
                                        CurrentProcess = (DWORD *)((BYTE
*)pActiveProcessList_Next - globals.ActiveProcessLinksOffset);
                                        if ((DWORD)CurrentProcess ==
(DWORD)TerminateProcess)
                                        {
                                           bFoundNextList= TRUE;
                                           break;
                                        }
                                        else
                                        {
                                           if (pActiveProcessList_Next !=
NULL)
                                                  pActiveProcessList_Next =
pActiveProcessList_Next->NextProcess;
                                           else
                                           {
                                              // the list is broken, this
                                              //condition should not happen
                                              #ifdef DEBUG_PRN
                                              DbgPrint ( "Error:
pActiveProcessList_Next = NULL\r\n" );
                                              #endif
                                              break;
                                           }
                                        }
```

APPENDIX A-continued

```
                nCheckedProc++;
            } while
((pActiveProcessList_Next!=globals.PsActiveProcessHead)&&(nCheckedProc<nSystemProcesses));
            // scan the Blink pointers
            nCheckedProc = 0;
            pActiveProcessList_Previous =
(PACTIVE_PROCESS_LIST) globals.PsActiveProcessHead->PreviousProcess;
            do
            {
                DWORD * CurrentProcess;
                CurrentProcess = (DWORD *)((BYTE *)pActiveProcessList_Previous - globals.ActiveProcessLinksOffset);
                if ((DWORD)CurrentProcess == (DWORD)TerminateProcess)
                {
                    bFoundPreviousList= TRUE;
                    break;
                }
                else
                {
                    if (pActiveProcessList_Previous != NULL)
                        pActiveProcessList_Previous = pActiveProcessList_Previous->PreviousProcess;
                    else
                    {
                        // the list is broken, this condition should not happen
                        #ifdef DEBUG_PRN
                        DbgPrint ( "Error: pActiveProcessList_Next = NULL\r\n" );
                        #endif
                        break;
                    }
                }
                nCheckedProc++;
            } while
((pActiveProcessList_Previous!=globals.PsActiveProcessHead)&&(nCheckedProc<nSystemProcesses));
            if ( (bFoundPreviousList != TRUE) && (bFoundNextList!=TRUE) )
            {
                // the terminated process is not found in the
                //ActiveProcessList
                // adjust the terminated process pointers
                PACTIVE_PROCESS_LIST pActiveProcessList;
                pActiveProcessList = (PACTIVE_PROCESS_LIST)((BYTE *)TerminateProcess + globals.ActiveProcessLinksOffset);
                pActiveProcessList->NextProcess = (PACTIVE_PROCESS_LIST) globals.PsActiveProcessHead;
                pActiveProcessList->PreviousProcess = (PACTIVE_PROCESS_LIST) globals.PsActiveProcessHead->PreviousProcess;
            }
            ObDereferenceObject( TerminateProcess );
        }
    }
    ntStatus = ZwTerminateProcess_t ( hProcess, ExitStatus );
    ZwClose ( hProcess );
  }
 }
 return ntStatus;
}
```

What is claimed is:

1. A method, comprising:

inserting, by one or more processors, a hidden kernel process structure into an active process list by pointing a backward link of a pointer representing the active process list to a forward link of an active process links structure of the hidden kernel process structure;

synchronizing, by the one or more processors, memory operations to preserve state during the inserting of the hidden kernel process structure; and terminating, by the one or more processors, a hidden kernel process associated with the hidden kernel process structure.

2. The method of claim 1, wherein synchronizing memory operations comprises acquiring a mutex prior to inserting the hidden kernel process structure into the active process list.

3. The method of claim 1, wherein inserting the hidden kernel process structure comprises modifying links of the active process list to append the hidden kernel process structure to the end of the active process list.

4. The method of claim 1, wherein inserting the hidden kernel process structure comprises pointing a forward link of an active process links structure of a current last kernel process structure to the active process links structure of the hidden kernel process.

5. The method of claim 1, wherein inserting the hidden kernel process structure comprises:
   pointing a forward link of the hidden kernel process structure to a head of the active process list;
   pointing a backward link of the hidden kernel process to a current last kernel process structure;
   pointing a backward link of the head to the hidden kernel process structure; and
   pointing a forward link of the current last kernel process structure to the hidden kernel process structure.

6. The method of claim 1, wherein terminating the hidden kernel process comprises removing the inserted hidden kernel process structure from the active process list.

7. The method of claim 1, wherein:
   inserting the hidden kernel process structure comprises modifying links of the active process list to append the hidden kernel process structure to the end of the active process list; and
   terminating the hidden kernel process comprises removing the inserted hidden kernel process structure from the active process list.

8. Non-transitory media that includes code for execution and when executed by one or more processors to perform operations comprising:
   inserting, by the one or more processors, a hidden kernel process structure into an active process list by pointing a backward link of a pointer representing the active process list to a forward link of an active process links structure of the hidden kernel process structure;
   synchronizing, by the one or more processors, memory operations to preserve state during the inserting of the hidden kernel process structure; and
   terminating, by the one or more processors, a hidden kernel process associated with the hidden kernel process structure.

9. The media of claim 8, wherein synchronizing memory operations comprises acquiring a mutex prior to inserting the hidden kernel process structure into the active process list.

10. The media of claim 8, wherein inserting the hidden kernel process structure comprises modifying links of the active process list to append the hidden kernel process structure to the end of the active process list.

11. The media of claim 8, wherein inserting the hidden kernel process structure comprises pointing a forward link of an active process links structure of a current last kernel process structure to the active process links structure of the hidden kernel process.

12. The media of claim 8, wherein inserting the hidden kernel process structure comprises:
   pointing a forward link of the hidden kernel process structure to a head of the active process list;
   pointing a backward link of the hidden kernel process to a current last kernel process structure;
   pointing a backward link of the head to the hidden kernel process structure; and
   pointing a forward link of the current last kernel process structure to the hidden kernel process structure.

13. The media of claim 8, wherein terminating the hidden kernel process comprises removing the inserted hidden kernel process structure from the active process list.

14. The media of claim 8, wherein:
   inserting the hidden kernel process structure comprises modifying links of the active process list to append the hidden kernel process structure to the end of the active process list; and
   terminating the hidden kernel process comprises removing the inserted hidden kernel process structure from the active process list.

15. A system, comprising:
   one or more processors to execute instructions such that the system is configured for:
   inserting a hidden kernel process structure into an active process list by pointing a backward link of a pointer representing the active process list to a forward link of an active process links structure of the hidden kernel process structure;
   synchronizing memory operations to preserve state during the inserting of the hidden kernel process structure; and
   terminating a hidden kernel process associated with the hidden kernel process structure.

16. The system of claim 15, wherein synchronizing memory operations comprises acquiring a mutex prior to inserting the hidden kernel process structure into the active process list.

17. The system of claim 15, wherein inserting the hidden kernel process structure comprises modifying links of the active process list to append the hidden kernel process structure to the end of the active process list.

18. The system of claim 15, wherein inserting the hidden kernel process structure comprises pointing a forward link of an active process links structure of a current last kernel process structure to the active process links structure of the hidden kernel process.

19. The system of claim 15, wherein inserting the hidden kernel process structure comprises:
   pointing a forward link of the hidden kernel process structure to a head of the active process list;
   pointing a backward link of the hidden kernel process to a current last kernel process structure;
   pointing a backward link of the head to the hidden kernel process structure; and
   pointing a forward link of the current last kernel process structure to the hidden kernel process structure.

20. The system of claim 15, wherein terminating the hidden kernel process comprises removing the inserted hidden kernel process structure from the active process list.

* * * * *